(12) United States Patent
Koop et al.

(10) Patent No.: US 8,267,234 B2
(45) Date of Patent: Sep. 18, 2012

(54) ADJUSTABLE DRIVE COUPLING FOR ADJACENT ARCHITECTURAL COVERINGS

(75) Inventors: Lars Koop, Bremerhaven (DE); Jörg Bohlen, Langen (DE)

(73) Assignee: Hunter Douglas Industries BV, El Rotterdam (NL)

( * ) Notice: Subject to any disclaimer, the term of this patent is extended or adjusted under 35 U.S.C. 154(b) by 392 days.

(21) Appl. No.: 11/956,587

(22) Filed: Dec. 14, 2007

(65) Prior Publication Data

US 2008/0153606 A1 Jun. 26, 2008

(30) Foreign Application Priority Data

Dec. 21, 2006 (EP) .................................... 06026520

(51) Int. Cl.
| | |
|---|---|
| *F16D 7/00* | (2006.01) |
| *F16D 11/04* | (2006.01) |
| *F16D 11/10* | (2006.01) |
| *F16D 13/22* | (2006.01) |
| *A47H 1/00* | (2006.01) |

(52) U.S. Cl. ..................... 192/55.2; 192/69.7; 192/69.8; 160/120; 160/323.1

(58) Field of Classification Search .................. 160/120, 160/121, 1, 323.1, 324, 325, 326; 192/69.8, 192/69.82, 69.7, 89.27, 66.32, 55.2, 69.9, 192/69.91, 207; 464/82, 169, 182; 403/111, 403/166

See application file for complete search history.

(56) References Cited

U.S. PATENT DOCUMENTS

| | | | | | |
|---|---|---|---|---|---|
| 642,423 | A | * | 1/1900 | Brodie .......................... | 160/120 |
| 1,019,169 | A | * | 3/1912 | McCloud ...................... | 160/120 |
| 1,158,824 | A | * | 11/1915 | McCloud ...................... | 160/120 |
| 2,378,145 | A | * | 6/1945 | Lewis .................... | 160/176.1 R |
| 2,585,769 | A | * | 2/1952 | Hamlin ......................... | 160/120 |

(Continued)

FOREIGN PATENT DOCUMENTS

DE 195 46 203 C1 3/1997

(Continued)

OTHER PUBLICATIONS

Radiate. (n.d.). Dictionary.com Unabridged. Retrieved Mar. 24, 2011, from Dictionary.com website: http://dictionary.reference.com/browse/radiate (provided in the body of the Office Action).*

*Primary Examiner* — Blair M Johnson
*Assistant Examiner* — Jaime F Cardenas-Garcia
(74) *Attorney, Agent, or Firm* — Dorsey & Whitney LLP (57) ABSTRACT

A force transmitting coupling for drivingly coupling winding devices of adjacent architectural coverings. The coupling includes first coupling member, a second coupling member, and mating engagement means on the first and second coupling members adapted to establish mating engagement between the first and second coupling member to transmit a drive force from one of the first and second coupling members to another of the first and second coupling members. The second coupling member includes a hub and the engaging means on the second coupling member are resiliently connected to the hub.

31 Claims, 10 Drawing Sheets

U.S. PATENT DOCUMENTS

| | | | | |
|---|---|---|---|---|
| 2,755,900 | A * | 7/1956 | Seyfried | 192/55.2 |
| RE24,607 | E * | 2/1959 | Seyfried | 192/55.2 |
| 2,943,464 | A * | 7/1960 | Voges | 464/73 |
| 3,298,197 | A * | 1/1967 | Roth | 464/182 |
| 3,371,549 | A * | 3/1968 | Schrempp | 74/411 |
| 3,389,738 | A * | 6/1968 | Roth | 160/120 |
| 3,406,583 | A * | 10/1968 | Baier | 74/411 |
| 3,446,263 | A * | 5/1969 | Roth | 160/120 |
| 3,529,440 | A * | 9/1970 | Bauer | 464/73 |
| 3,662,568 | A * | 5/1972 | Kashima et al. | 464/93 |
| 3,724,239 | A * | 4/1973 | Calistrat | 464/92 |
| 3,880,267 | A * | 4/1975 | Auble et al. | 192/108 |
| 3,918,559 | A * | 11/1975 | Rousset | 192/54.5 |
| 4,231,411 | A * | 11/1980 | Hehl et al. | 160/120 |
| 4,335,586 | A * | 6/1982 | Kochendorfer et al. | 464/81 |
| 4,619,156 | A * | 10/1986 | Kiryu | 74/640 |
| 4,653,564 | A * | 3/1987 | Marocco | 160/168.1 R |
| 4,657,059 | A * | 4/1987 | Clauss | 160/120 |
| 4,748,865 | A * | 6/1988 | Umezawa et al. | 74/411 |
| 4,836,264 | A * | 6/1989 | Machin | 160/120 |
| 4,899,608 | A * | 2/1990 | Knappe et al. | 74/411 |
| RE33,216 | E * | 5/1990 | Marocco | 160/168.1 R |
| 5,000,721 | A * | 3/1991 | Williams | 464/37 |
| 5,010,940 | A * | 4/1991 | Marocco | 160/168.1 R |
| 5,016,701 | A * | 5/1991 | Vore | 160/241 |
| 5,178,026 | A * | 1/1993 | Matsumoto | 74/411 |
| D338,966 | S * | 8/1993 | Pinard | D25/53 |
| 5,653,144 | A * | 8/1997 | Fenelon | 74/411 |
| 5,762,556 | A * | 6/1998 | Kurian | 464/46 |
| 6,202,509 | B1 * | 3/2001 | Dold | 74/640 |
| 6,393,929 | B1 * | 5/2002 | Quere et al. | 74/411 |
| 6,419,068 | B1 * | 7/2002 | Stephan et al. | 192/219.5 |
| 6,647,818 | B1 * | 11/2003 | Takeuchi et al. | 74/411 |
| 6,684,729 | B2 * | 2/2004 | Bauseler | 74/460 |
| 6,705,378 | B1 * | 3/2004 | Smidt | 160/120 |
| 6,745,882 | B2 * | 6/2004 | Ai | 192/48.8 |
| 6,776,067 | B2 * | 8/2004 | Bogelein et al. | 74/640 |
| 6,805,025 | B2 * | 10/2004 | Ruttor | 74/640 |
| 6,817,402 | B1 * | 11/2004 | Fraczek et al. | 160/323.1 |
| 6,983,783 | B2 * | 1/2006 | Carmen et al. | 160/120 |
| 7,051,782 | B2 * | 5/2006 | Nichols et al. | 160/310 |
| 7,240,716 | B2 * | 7/2007 | Nichols et al. | 160/310 |
| 7,281,565 | B2 * | 10/2007 | Carmen et al. | 160/310 |
| 7,537,040 | B2 * | 5/2009 | Carmen et al. | 160/120 |
| 7,625,151 | B2 * | 12/2009 | Li et al. | 403/102 |
| 7,635,018 | B2 * | 12/2009 | Carmen et al. | 160/310 |
| 7,740,047 | B2 * | 6/2010 | Koop et al. | 160/323.1 |
| 2003/0121745 | A1 * | 7/2003 | Ai | 192/69.6 |
| 2003/0121747 | A1 * | 7/2003 | Ai | 192/69.91 |
| 2004/0129849 | A1 * | 7/2004 | Walker et al. | 248/266 |
| 2004/0250964 | A1 * | 12/2004 | Carmen et al. | 160/120 |
| 2005/0087313 | A1 * | 4/2005 | Nichols et al. | 160/310 |
| 2006/0021714 | A1 * | 2/2006 | Carmen et al. | 160/120 |
| 2006/0137833 | A1 * | 6/2006 | Nichols et al. | 160/310 |
| 2006/0272782 | A1 * | 12/2006 | Nichols et al. | 160/120 |
| 2007/0253768 | A1 * | 11/2007 | Li et al. | 403/305 |
| 2008/0067278 | A1 * | 3/2008 | Fortunato et al. | 242/407 |
| 2008/0142171 | A1 * | 6/2008 | Koop et al. | 160/243 |

FOREIGN PATENT DOCUMENTS

| | | |
|---|---|---|
| DE | 19546203 C1 * | 3/1997 |
| WO | WO 2006/012894 A1 | 2/2006 |
| WO | WO 2006042377 A1 * | 4/2006 |

* cited by examiner

ADJUSTABLE DRIVE COUPLING FOR ADJACENT ARCHITECTURAL COVERINGS

CROSS REFERENCE TO RELATED APPLICATION

This application claims priority to European Application No. 06026520.4, filed 21 Dec. 2006, and such application is hereby incorporated by reference as if fully disclosed herein.

BACKGROUND OF THE INVENTION

1. Field of the Invention

The present invention relates to a coupling for drivingly coupling winding devices of adjacent architectural coverings. More in particular the invention relates to such force transmitting couplings that include a first coupling member, a second coupling member and engagement means between the first and second coupling members adapted to provide angular adjustment between the winding devices of the two adjacent architectural coverings.

2. Description of the Relevant Art

It has been proposed in WO 2006/102894 to obtain angular fine adjustment between blind rollers by providing a wrap spring coupling between the two blind rollers, which normally is in frictional engagement, but which can be disengaged for making fine adjustments. While this arrangement has provided for accurate adjustment in aligning the lower blind edges of adjacent roller blinds, it has also offered little resistance against peak torques that can occur during operation of the blinds, from disturbing the adjustments made. Such peak torques are due to inherent inertia in the blinds themselves as well as changes in operating direction and/or speed. It has thus been proposed, such as in DE 19546203, to resort to structural mating engagement between the adjustable drive coupling members to prevent the adjusted angular position from becoming disturbed by operating forces. However with larger blind units, such as often encountered in utility buildings, there have been cases where operating peak torques have completely ripped off the mating structural means that provided the positive engagement between the coupling members.

BRIEF SUMMARY OF THE INVENTION

Accordingly it is an object of the present invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful choice.

To this end the present invention provides a force transmitting coupling for drivingly coupling winding devices of adjacent window coverings, the coupling including: a first coupling member; a second coupling member; mating engagement means on the first and second coupling members adapted to establish mating engagement between the first and second coupling member to transmit a drive force from one of the first and second coupling members to another of the first and second coupling members, wherein the second coupling member includes a hub and wherein the engaging means on the second coupling member are resiliently connected to the hub. Surprisingly it has been found that the resilient connection between the engaging means on one of the coupling members and its relevant hub effectively cushions the occurring peak torques and thereby successfully prevents any damage to the engagement means.

Other advantageous variations will become apparent from the below description and from the appended claims.

BRIEF DESCRIPTION OF THE DRAWINGS

The invention will now be described in reference to the appended drawing Figures in which.

DESCRIPTION OF THE PREFERRED EMBODIMENTS

Figure 1:
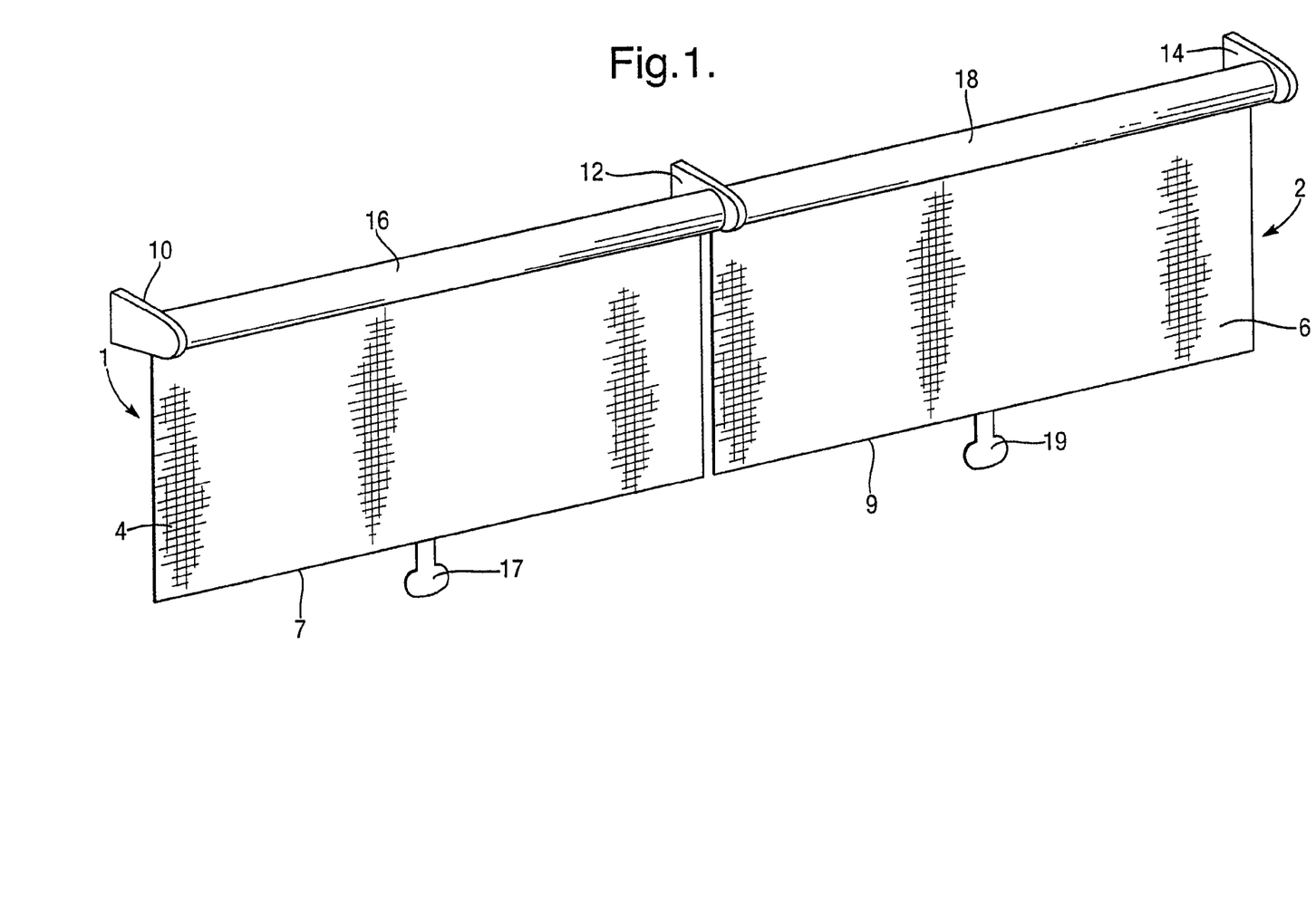
FIG. 1 is a general perspective view of a set of adjacent window covering, having a common intermediate bearing bracket, which includes a coupling in accordance with the invention.

FIG. 1 shows a first window covering in the form of a first roller blind 1 and an adjacent second window covering also in the form of a second roller blind 2. The first roller blind 1 has a first winding device or blind roller 16 with its ends rotatably mounted between a left-hand end mounting bracket 10 and an intermediate mounting bracket 12. The second roller blind 2 has its winding device or second blind roller 18 rotatably mounted between the intermediate bracket 12 and a right-hand end mounting bracket 14. As is conventional the mounting brackets 10, 12, 14 serve to mount the roller blinds to a wall or ceiling surface (not shown). The roller blind 1 has a first shade member 4, shown partly rolled up on a winding device, such as a usually tubular blind roller 16. Similar, roller blind 2 as a second shade member 6 that is also partially rolled up on another winding device such as a usually tubular blind roller 18. While the window coverings shown are roller blinds it is also conceivable that one or both of the adjacent window coverings could be roman type or pleated shades that are retracted by lift cords. Such lift cords will than be wound onto roller 16 and/or roller 18 in stead of the shade member material 4, 6. It is further seen in FIG. 1 that the respective bottom edges 7, 9 of the shade member materials 4, 6, respectively, are provided with a pull-tab 17, 19 for operating the blinds.

Figure 2:
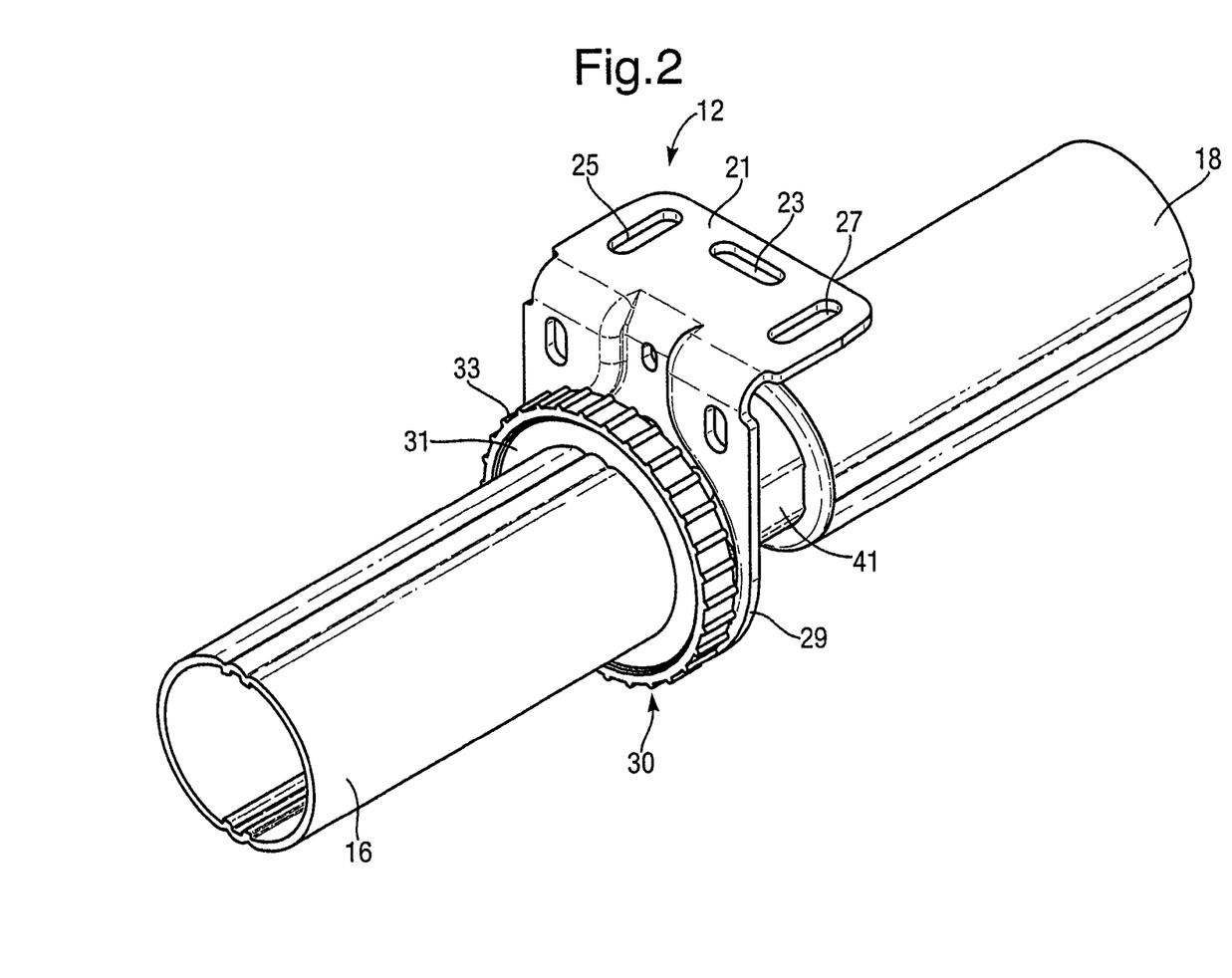
FIG. 2 is an enlarged partial view of the set of window coverings of FIG. 1, showing a suitable variant of an intermediate bearing and coupling.

FIG. 2 shows an enlarged partial detail of the structure of the intermediate bracket 12. The intermediate bracket 12 has a first mounting flange 21, which is shown here in a position for mounting to an overhead surface, but in all other respects it represents the intermediate bracket 12 as shown in FIG. 1. The intermediate mounting bracket 12 is preferably of a design that is similar to the end brackets 10, 14 so that stock keeping may be simplified. The first flange 21 has an appropriate series of slots, generally indicated with the numeral 23, 25, 27, for inserting mounting screws (not shown, but conventional).

On one side of a second, vertical flange 29 of the bracket 12, is positioned the coupling 30 that connects the winding device or roller 16 to the winding device or roller 18 on the opposite side of the vertical flange 29. The coupling 30 has first coupling member 31 that is drivingly connected to the first winding, device 16 and a second coupling member 33 made of a single material that is drivingly connected to the second winding device 18. The driving force from the second coupling member 33 is taken through a central bore in the second bracket flange 29 (not visible in FIG. 2). The second member 33 drivingly engages an end plug 41 of the roller 18.

Figure 3:
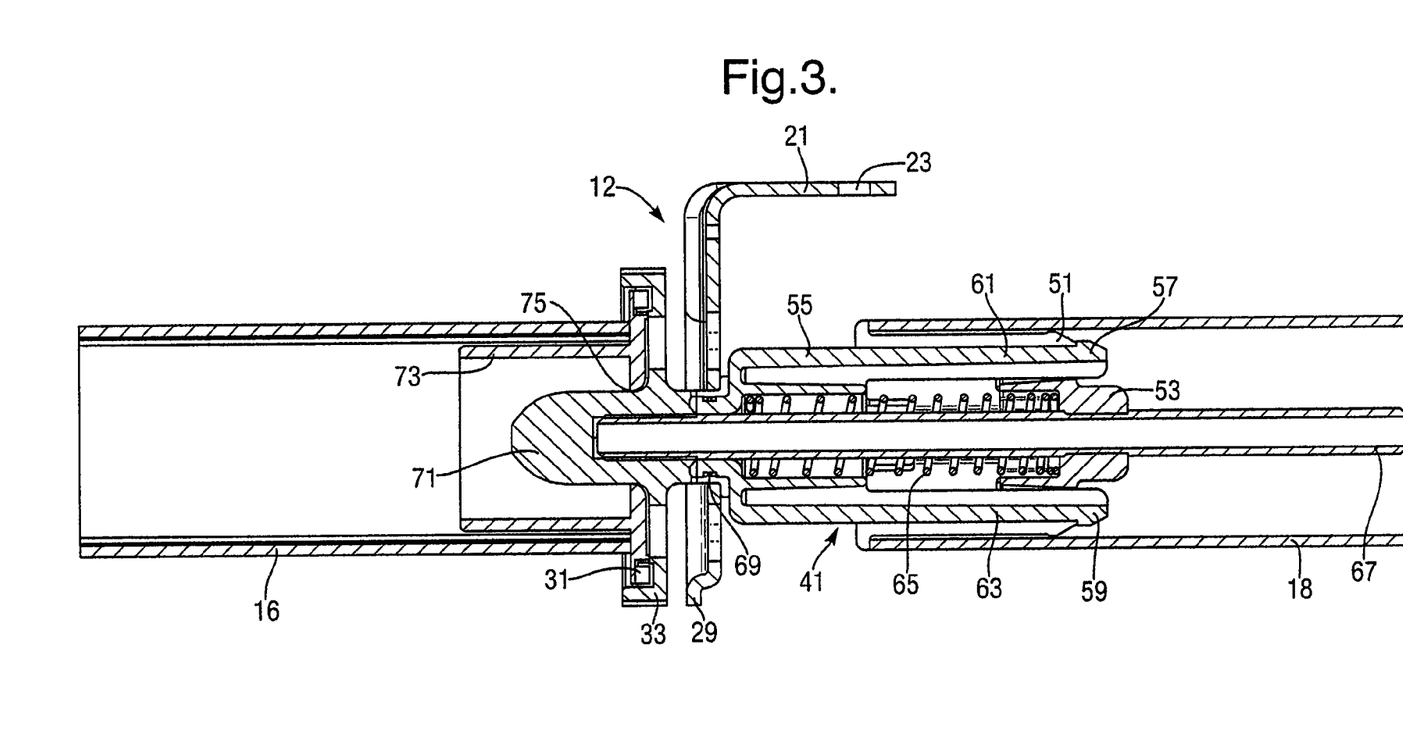
FIG. 3 is a longitudinal cross-section of the intermediate bearing and coupling of FIG. 2.

FIG. 3 is a longitudinal cross-section of the enlarged detail shown in FIG. 2. The same elements are indicated by the same reference numerals as used in FIG. 2. As can be seen from FIG. 3, the vertical second bracket flange 29 has a central aperture 47 best seen in FIG. 4, and a pattern of radially arranged slots 45 around the central aperture 47. The pattern of radially arranged slots 45 can be used for mounting a drive unit to the bracket 12, when it is used as an end bracket rather than as an intermediate bracket. No further description is however deemed necessary here, as this aspect is not part of the present invention.

Referring back to FIG. 3 it can be seen that the end plug 41 has a generally, cylindrical plug body 51 having an end wall 53 and thereby defining an axially extending central cavity. A cylindrical plunger 55 is accommodated within the central cavity of the body 51 for telescopically sliding movement. The telescopic movement of the plunger 55 is outwardly limited by retaining detents 57, 59 positioned on axially extending tongues 61, 63 which each extend through openings in the end wall 53. The plunger 55 is biased towards its outermost position by a compression spring 65. In principle this telescopic end plug 41 is similar in function to the end plug described in GB 2339820, except that its specific configuration allows the insertion of a coupling shaft 67.

Figure 4:
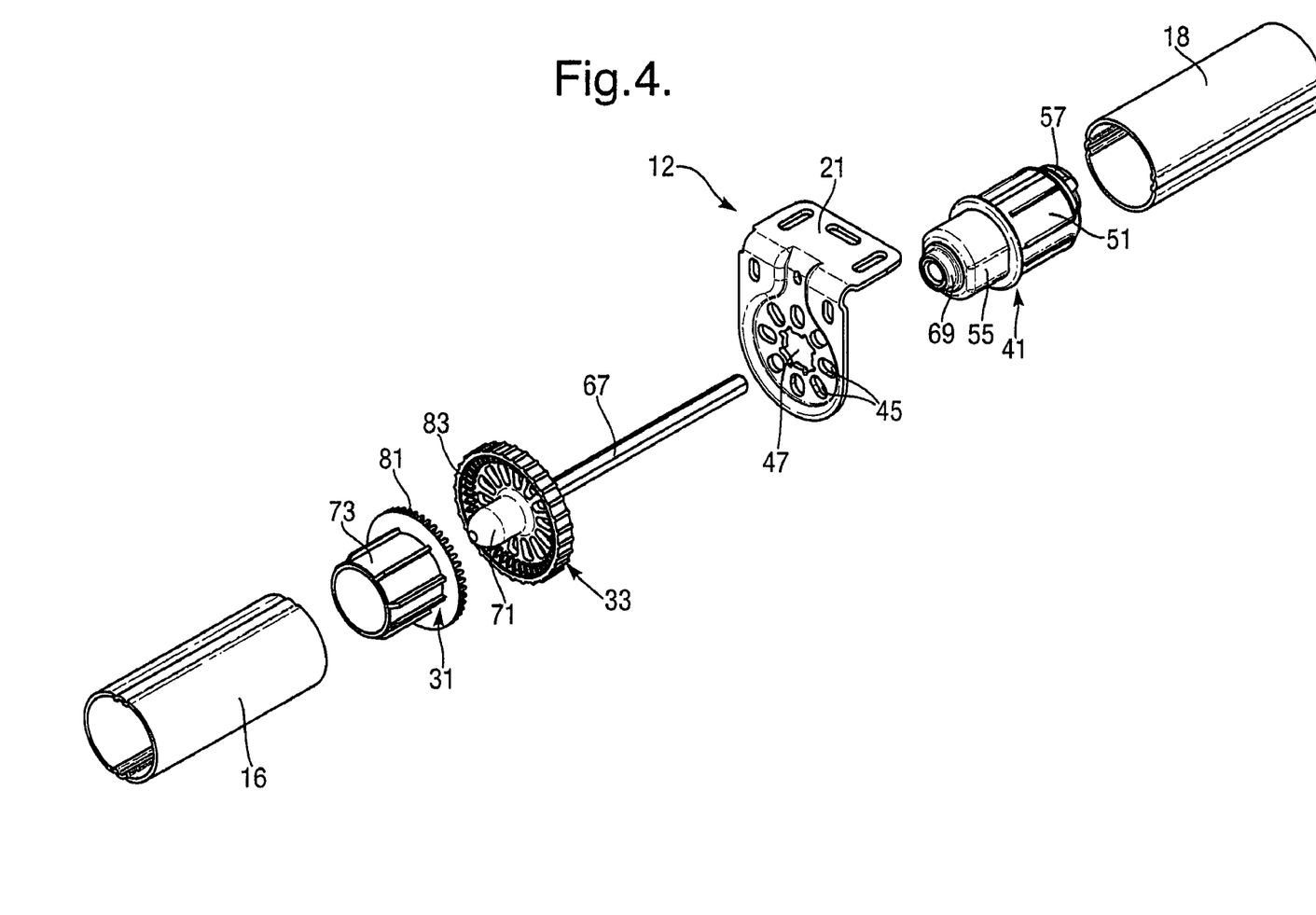
FIG. 4 is an exploded view of the partial assembly of FIGS. 2 and 3.
Figure 5:
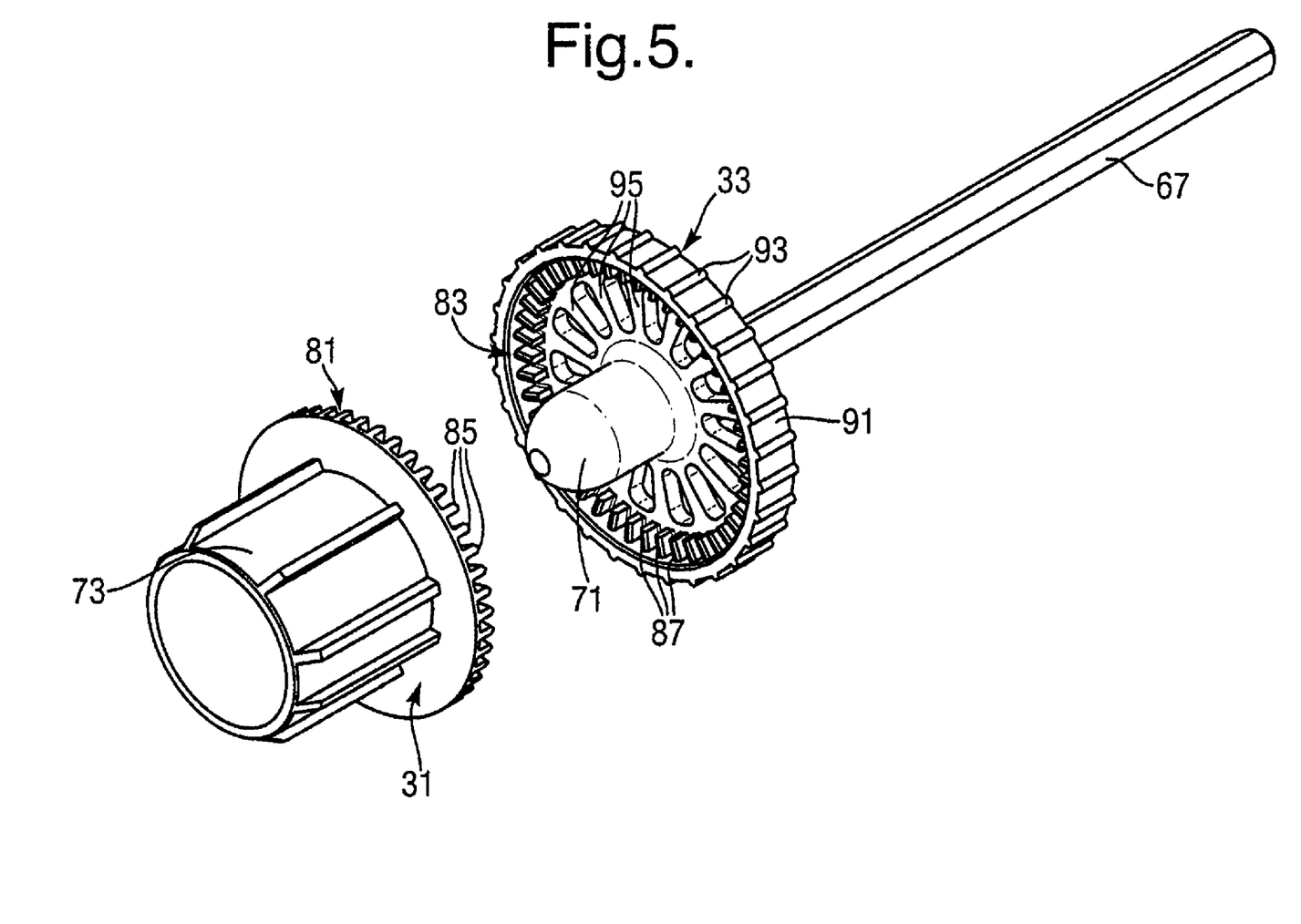
FIG. 5 is a detailed perspective view of the first and second coupling members of the invention.

This coupling shaft 67 can have a hexagonal cross-section or any other non-circular cross-section adapted to transmit torque by a mating form fit, rather than by being clampingly engaged. Further the plunger 55 on its outer end has a journal 69 by which it is rotatably journalled in the central opening 47. The coupling shaft 67 has one axial end fixed to a hub 71 of the second coupling member 33. The first coupling member 31 has a cylindrical sleeve 73 that snuggly fits within the roller tube 16 in a torque transmitting member. To this end the inner circumference of the roller tube 16 and the outer circumference of the sleeve 73 preferably are provided with mating formations. Also the first coupling member 31 has a central aperture 75 to receive the hub 71 of the second coupling member 33. To guide the first coupling member 31 onto the second coupling member 33, the hub 71 preferably has a rounded end as shown in FIGS. 3 to 5. Similarly the central aperture 75 of the first coupling member 31 can have a rounded or chamfered entrance to assist guidance of the hub 71 there into. The roller tube 18 can have an arrangement similar to the right hand end of the roller tube 16, at its right hand end. The telescoping end plug 41 will than allow the roller tube 18 to be moved to the left in FIG. 3 and engaged with a corresponding hub structure 71 on its right hand end. This is a conventional manner of mounting roller blind rollers between opposite brackets, such as those shown in FIG. 1. Similarly the left hand end of roller tube 16 (in FIG. 3) can have a telescoping end plug on its left hand end.

Referring now to FIGS. 4 and 5 it will be seen that the first coupling member 31 has first engagement means 81 on its face facing the second coupling member 33. The second coupling member 33 is provided with second complementary, mating engagement means 83 on its face facing the first coupling member 31.

FIG. 5, now in more detail, shows that the first engagement means 81 of the first coupling member 31 are represented by a plurality of first teeth 85 formed at the perimeter of the first coupling member 31. The second engagement means on the second coupling member 33 are represented by a plurality of second teeth 87, structurally mating and complementary to the first teeth 85. In this manner the first and second coupling members 31, 33 can be axially engaged and disengaged, while providing rotational adjustment of the second coupling member 33 in respect of the first coupling member 31. Axial movement necessary for this engagement and disengagement will be provided by a telescoping end plug 41 on the opposite end of roller tube 16 (see FIG. 4). A possibly great number of first teeth 85 and complementary second teeth 87 is preferred so as to obtain rotational adjustability at possibly small increments. The preference for possibly small increments of rotational adjustment is only set limits by the ability to make teeth that are both small enough but yet sufficiently strong to transmit torque from one coupling member to the other coupling member.

As can also be seen in FIG. 5, the second coupling member 33 has a perimeter rim 91, which here is provided on its exterior with optional manual gripping means in the form of ribs 93. The perimeter rim 91 and the plurality of second teeth 87 are connected to the hub 71 by a plurality of radial spokes 95. The spokes 95 are somewhat resilient and allow for cushioning of peak torque values that are transmitted between the engagement means 81, 83 and the shaft 67.

Figure 6:
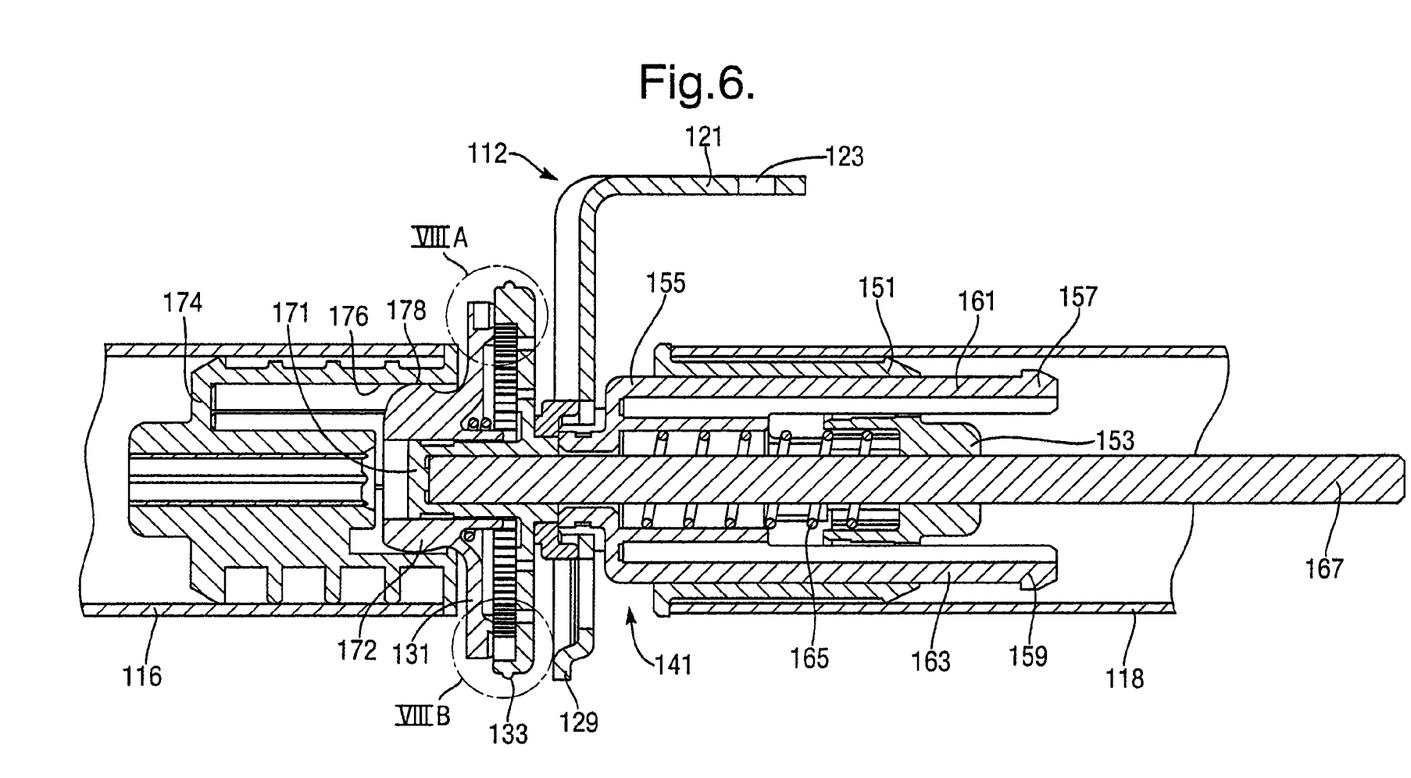
FIG. 6 is a longitudinal cross-section of the intermediate bearing and coupling according to a further embodiment of the invention.
Figure 7:
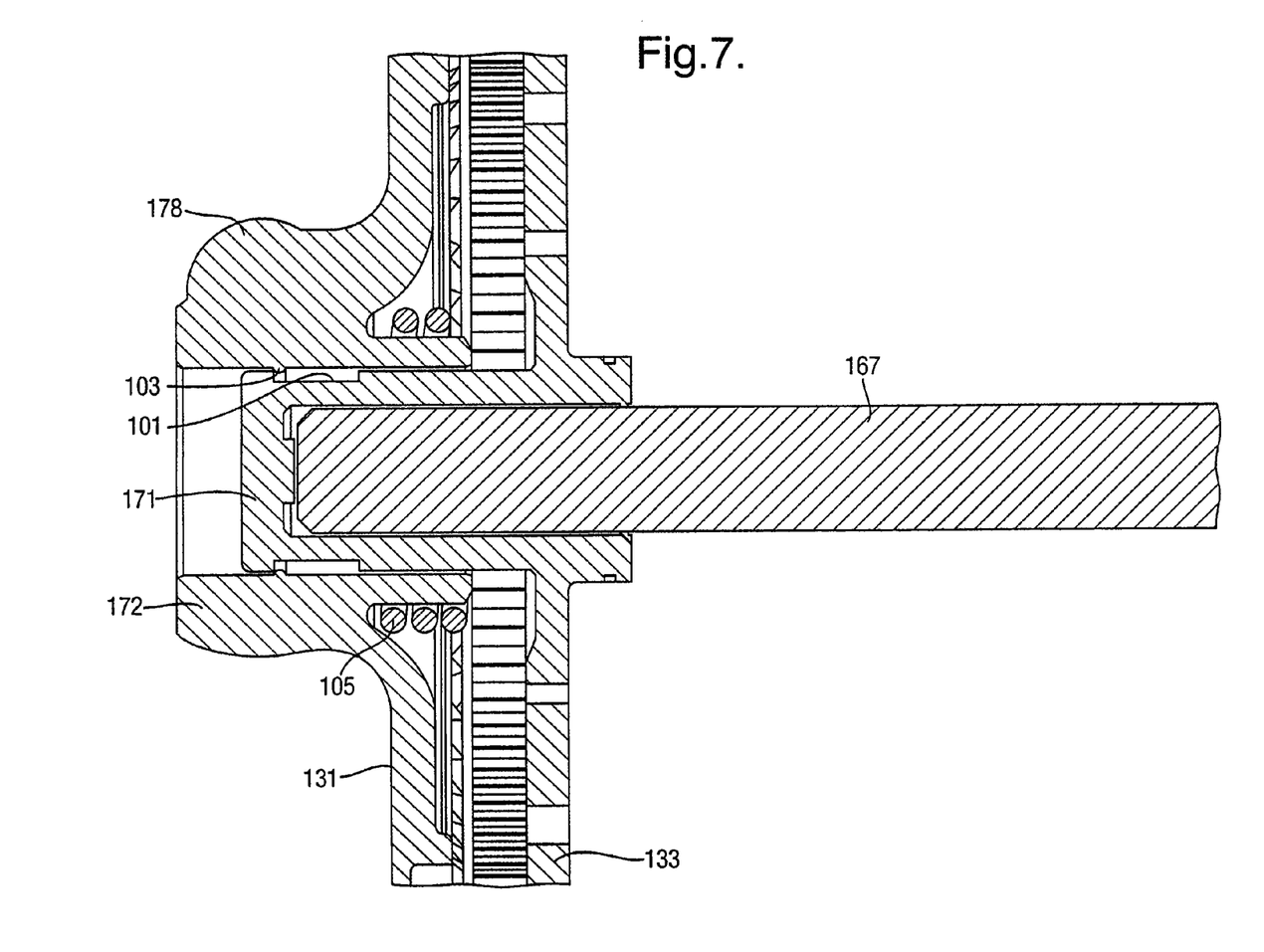
FIG. 7 is an enlarged detail view based on FIG. 6.

FIG. 6 is a longitudinal cross section similar to FIG. 3 but showing a slightly different embodiment of the invention. Like parts will be numbered by numerals that are greater by exactly one hundred. An intermediate mounting bracket 112 has a first horizontally extending mounting flange 121 and a vertically extending further bracket flange 129. This bracket 112 is in fact identical to the intermediate bracket already described. An end plug 141 has a generally cylindrical plug body 151 with an end wall 153, which together define an axially extending central cavity. A cylindrical plunger 155 is slidably received within this central cavity for telescopic movement. Detents 157, 159 on axially extending tongues 161, 163 limit the outward movement of the plunger 155. The plunger 155 is biased outwardly by a compression spring 165. A hexagonal coupling shaft 167 is non-rotatably received in the end plug 141. The left hand end of the coupling shaft 167 is again engaged with a hub part 171 of a modified form of second coupling member 133. A modified form of first coupling member 131 has a male torque transmitting member 172 on its side facing the first winding tube 116. The male torque transmitting member is engaged for rotation with a hollow end plug 174, which is non-rotatably inserted into one longitudinal end of tube 116. The hollow end plug 174 has a female torque transmitting cavity 176 for receiving the male torque transmitting member 172 of the first coupling member 131. A preferred torque transmitting arrangement between the male and female member 172 and 176 includes three equally spaced radially extending protrusions 178 (best seen in FIG. 9) and three mating, equally spaced parallel grooves that extend axially of an inside peripheral wall of the female torque transmitting cavity. Such a torque transmitting arrangement will accommodate any slight degree of angular mismatch between the coupled blind roller tubes 116 and 118.

In contrast with the embodiment of FIGS. 2 to 5, the embodiment of FIGS. 6 to 10 does not come apart when the roller tube 116 is removed from its brackets. As is best seen in the enlarged detail view of FIG. 7, the hub part 171 of the second coupling member 133 has an annular groove 101. The male torque transmitting member 172 on an inner peripheral surface has an annular ridge 103 by which it is retained to the annular groove 101.

The annular groove 101 is sufficiently wide in relation to the ridge 103 to allow full axial disengagement of the first and second coupling members 131, 133. Because the first coupling member 131 in this embodiment cannot rely on any axial movement of the winding tube 116 for its axial disengagement, a compression spring 105 is positioned between the first and second coupling members 131, 133 to urge them apart. However, the force of spring 105 is chosen to be substantially less than the axial spring force acting on the winding tube 116, while keeping the coupling members 131, 133 engaged. As explained in relation to the embodiment of FIGS. 2 to 5 such axial spring force results from a telescopic end plug 141 acting on the opposite end of the first winding tube 116.

Figure 8A:
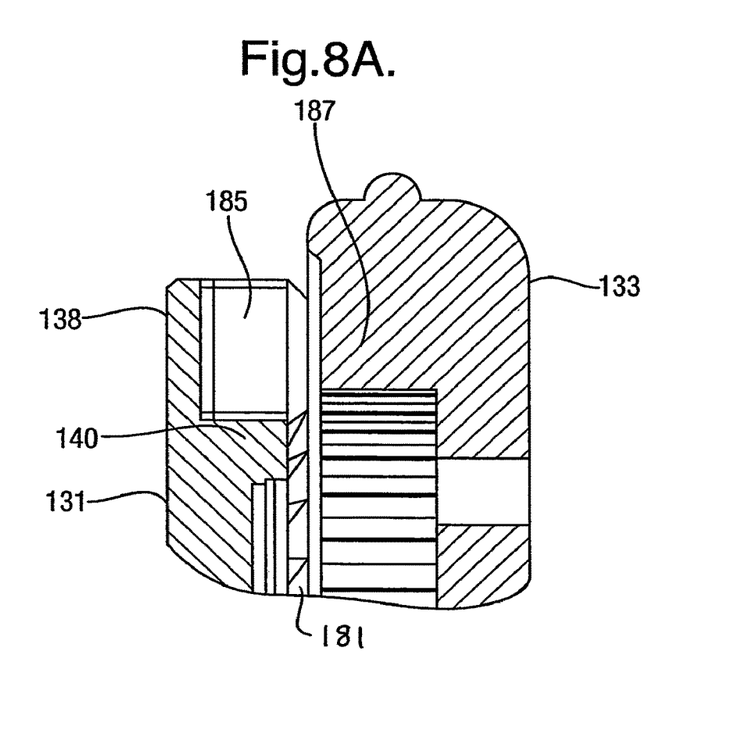
FIG. 8A is an enlarged detail according to VIII-A in FIG. 6.
Figure 8B:
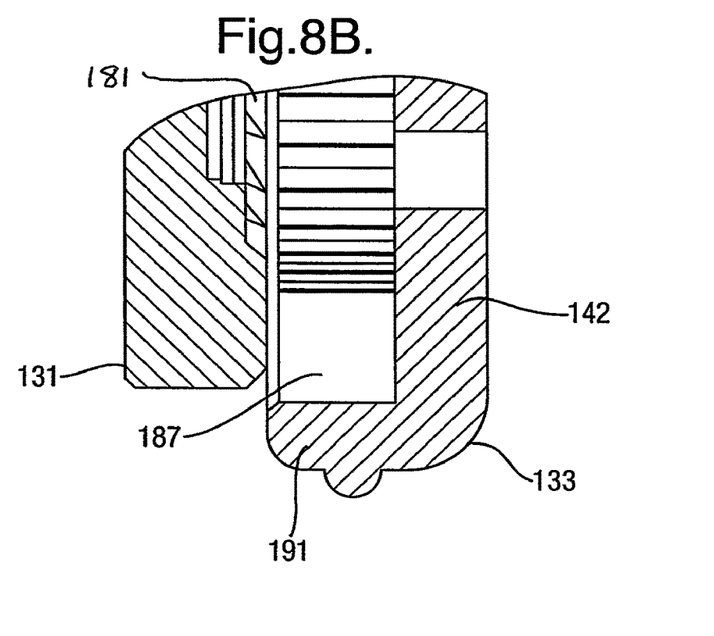
FIG. 8B is an enlarged detail according to VIII-B in FIG. 6.

As best seen in FIGS. 8A, 8B, 9 and 10, the engagement means 181 of the first coupling member similar to the first embodiment, are represented by a plurality of first teeth 185 that are formed at the perimeter of the first coupling member 131. The engagement means 183 on the second coupling member 133 are represented by a plurality of second teeth 187, structurally mating and complementary to the first teeth 185. FIG. 8A is an enlarged detail of the portion indicated as VIII-A in FIG. 6 and FIG. 8B is an enlarged detail of portion VIII-B in FIG. 6. In FIG. 8A one dent 185 of the first coupling member 131 is shown in elevation, while a dent 187 of the second coupling member 133 is sectioned.

FIG. 8B shows the opposite situation where a dent 187 of the second coupling member 133 is shown in elevation and the confronting dent of the first coupling member 131 is sectioned. FIG. 8A also clearly shows how the teeth 185 of the first coupling member 131 are each supported from both a radial support surface 138 and from an axial support surface 140. FIG. 8B shows how the teeth 187 of the second coupling member 133 are each supported from an inner peripheral surface of the perimeter rim 191, as well as from a radial surface 142. In this way the teeth 185, 187 can be dimensioned both small, for accurate rotational adjustability and sufficiently strong to transmit the necessary torque.

Figure 9:
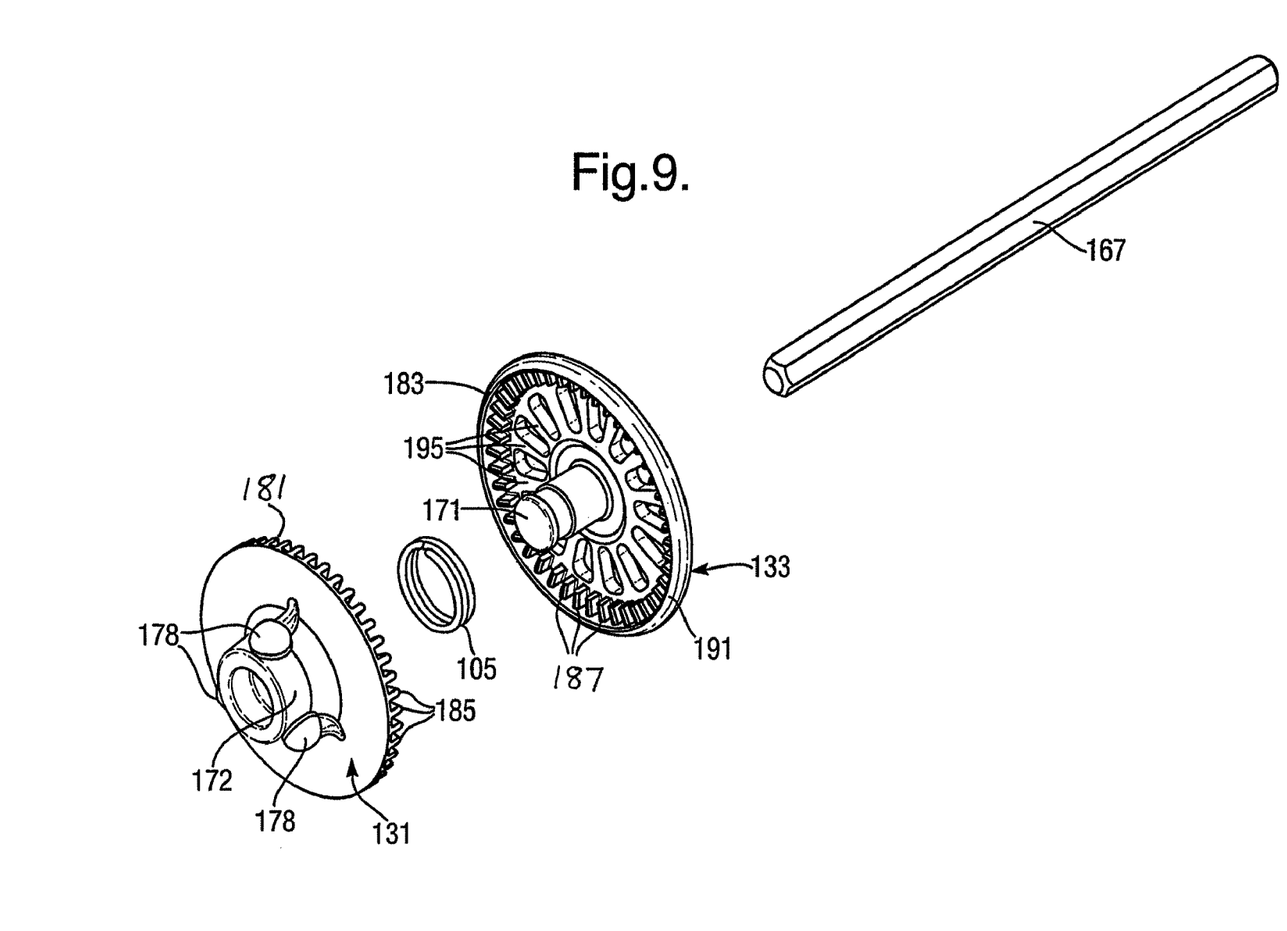
FIG. 9 is a detailed perspective view of the first and second coupling members of the further embodiment.
Figure 10:
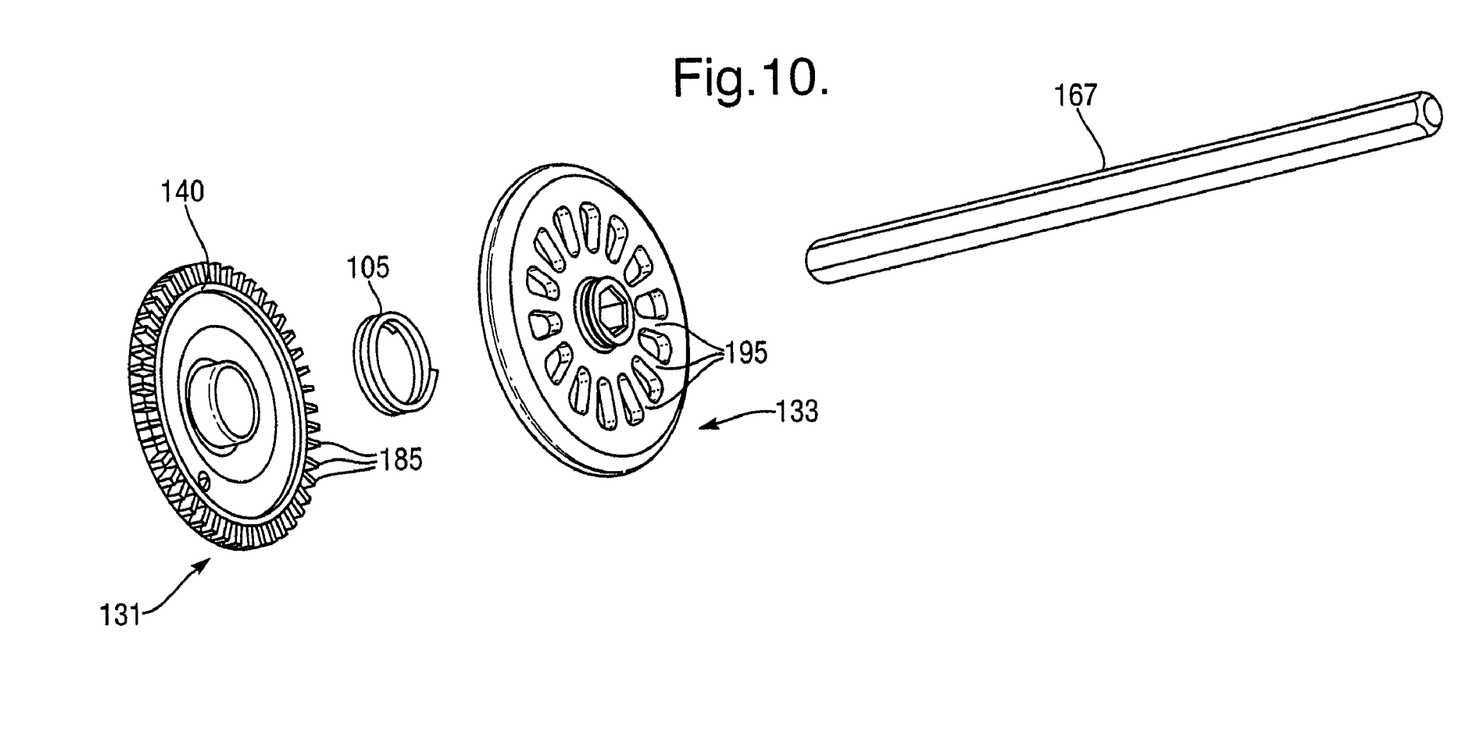
FIG. 10 is a detailed perspective view of the coupling members of the further embodiment, seen from a direction opposite to that of FIG. 9.

As more clearly seen in FIGS. 9 and 10, the perimeter rim section 191 which carries the torque transmitting teeth 187 is connected to the hub part 171 by a plurality of relatively flexible spokes 195. These spokes 195 cushion any excessive torque loads that may result in operation of the blind roller by inertia.

In use, the force transmitting couplings of FIGS. 2-5 and 6-10 allow the first and second winding roller 16 and 18, respectively 116 and 118, to be angularly adjusted with respect to one another. In the case of two adjacent roller shades as shown in FIG. 1, this means that the bottom edges 7 and 9 can be accurately aligned, which can be desirable from an esthetic point of view. At the same time the engaging coupling parts 31 and 33, or 131 and 133 respectively, are prevented from becoming dislocated or damaged by peak loads which are thus effectively cushioned by the flexible spokes 95 or 195 respectively.

It is thus believed that the operation and construction of the present invention will be apparent from the foregoing description. The term comprising when used in this description or the appended claims should not be construed in an exclusive or exhaustive sense but rather in an inclusive sense. Expressions such as: "means for . . . ". should be read as: "component configured for . . . " or "member constructed to . . . " and are to be construed to include equivalents for the structures disclosed. The use of expressions like: "critical", "preferred", "especially preferred" etc., is not intended to limit the invention. Features, which are not specifically or explicitly described or claimed, may be additionally included in the structure according to the present invention without deviating from its scope.

The invention is further not limited to any embodiment herein described and, within the purview of the skilled person, modifications are possible which should be considered within the scope of the appended claims. Equally all kinematic inversions are to be considered within the scope of the present invention.

Directional references (e.g., upper, lower, upward, downward, left, right, top, bottom, above, below, vertical, horizontal, axially, radially, tangentially, clockwise, or counterclockwise) are only used for identification purposes to assist in the understanding of the present invention, and should not be construed to create limitations, as to position orientation, or use of the invention. Reference to axially, radially and tangentially is generally in relation to rotatable or cylindrical bodies of elements described. Reference to longitudinal or lateral is generally in reference to the length or width directions respectively of elements which have an oblong appearance in the accompanying drawings.

The invention claimed is:

1. Force transmitting coupling for drivingly coupling a pair of adjacent axially aligned rollers for adjacent architectural coverings, the coupling including:
   a first coupling member including a flange drivingly connected to one of the rollers;
   a second coupling member drivingly connected to the other one of the rollers including
      an axially extending hub;
      a perimeter rim connected to and concentric with said hub; and
      an annular central region radially extending from an outer side surface of said hub to said rim, said central region defining a plurality of apertures forming spokes therebetween, where said spokes extend between said outer side surface of said hub to said rim, said rim forming a recess with said central region; and
   mating engagement means on the first and second coupling members adapted to establish mating engagement in an axial direction between the first and second coupling members to transmit a drive force from one of the first and second coupling members to another of the first and second coupling members, wherein
   said spokes cushion torque forces applied to the mating engagement means, and
   said flange of said first coupling member nests within said recess.

2. Coupling according to claim 1, wherein the spokes are rectilinear.

3. Coupling according to claim 1, wherein the mating engagement means include a plurality of axially engaging teeth which each are supported from both axial and radial support surfaces on their respective first and second coupling members.

4. Coupling according to claim 3, wherein the axially engaging teeth of at least one of the first and second coupling members each have a rounded or pent-roof shape on their respective front faces.

5. Coupling according to claim 1, wherein the outer circumference of the second coupling member has manual gripping means on its outer circumference.

6. Coupling according to claim 5, wherein the first coupling member is an integral part of a roller blind end plug.

7. Coupling according to claim 5, wherein the second coupling member co-operates with an intermediate mounting bracket to take the drive to a further roller.

8. Coupling according to claim 7, wherein the second coupling member is connected for rotation with the aligned drive shaft.

9. Coupling according to claim 1, wherein the engagement means includes an axis and wherein angular indexing can be adjusted with the first and second coupling members axially disengaged.

10. Coupling according to claim 1, wherein the coupling includes a spring, between the first and second coupling members, urging the first and second coupling members out of engagement, when not otherwise held in engagement.

11. The coupling of claim 1 wherein there is a single mounting bracket positioned between said rollers for rotatably supporting said rollers.

12. The coupling of claim 1 further including male and female torque transmitting members, said male member being driven by one of the coupling members and being nonrotatably inserted into said female member, said female member being nonrotatably inserted into one of said rollers.

13. The adjustable drive coupling of claim 1, wherein said spokes are at least partially resilient.

14. The adjustable drive coupling of claim 1, wherein said annular central region, said hub and said mating engagement means of said second coupling member are integrally formed.

15. The adjustable drive coupling of claim 1, wherein said spokes extend generally in a plane of the central region.

16. The adjustable drive coupling of claim 1, wherein said apertures have a smaller dimension adjacent said hub and a larger dimension adjacent said rim.

17. The force transmitting coupling of claim 1, wherein said flange is arranged within said recess to be adjacent to and aligned with said central region and a perimeter of said rim extends over a perimeter of said flange.

18. An adjustable drive coupling for architectural coverings comprising:
a first coupling member including a generally tubular sleeve configured to operably engage a roller tube for the architectural covering, a flange extending radially from a perimeter of the sleeve, a first set of radially aligned teeth extending axially from a surface of the flange, and a central alignment recess defined within the sleeve having an opening thereto positioned centrally in the sleeve;
a second coupling member including a central region, a hub axially extending from the central region, an axially extending rim positioned circumferentially around the central region, a second set of teeth radially aligned and axially extending from the central region adjacent the rim, apertures formed through the central region between the hub and the rim to define spokes therebetween to enhance torsionally resilient characteristics of the central region; and
a shaft operably attached to the second coupling member to apply a torque load to the second coupling member; wherein
the hub is received in the central alignment recess;
the first coupling member nests inside a recess of the second coupling member such that a perimeter of the rim extends axially beyond a perimeter of the flange;
the first coupling member engages the second coupling member via the first set of teeth to transmit a drive force from one of the first or second coupling members to another of the first or second coupling members, and the spokes cushion the torque loads transmitted between the first set of teeth and the shaft.

19. The adjustable drive coupling of claim 18, wherein the hub aligns the second coupling member with the first coupling member.

20. The adjustable drive coupling of claim 18, wherein the second coupling member further including ribs extending intermittently around an outer surface of the rim.

21. The adjustable drive coupling of claim 18, wherein the hub includes a rounded end configured to be at least partially received within the matingly-formed central alignment recess of the first coupling member.

22. The adjustable drive coupling of claim 18, wherein the central region is a resilient material.

23. The adjustable drive coupling of claim 18, wherein the central region is integrally formed with the hub and the second set of teeth.

24. The adjustable drive coupling of claim 18, wherein the spokes extend generally in a plane of the central region.

25. The adjustable drive coupling of claim 18, wherein said apertures have a smaller dimension adjacent said hub and a larger dimension adjacent said rim.

26. The adjustable drive coupling of claim 18, wherein the first set of teeth extend from a facial surface of the flange and are arranged around a perimeter of the facial surface of the flange.

27. The adjustable drive coupling of claim 18, wherein the rim defines the recess and the flange is completely received within the recess.

28. An adjustable drive coupling for architectural coverings comprising:
a first coupling member including a generally tubular sleeve configured to operably engage a roller tube for the architectural covering, a flange extending radially from a perimeter of the sleeve, a first set of radially aligned teeth extending axially from a surface of the flange, and a central alignment recess defined within the sleeve and an opening thereto positioned centrally in the sleeve;
a second coupling member including a central region, a hub extending from the central region, an axially extending rim positioned circumferentially around the central region, the rim and the central region defining a recess annularly disposed around the hub, a second set of teeth radially aligned and axially extending from the central region adjacent the rim, apertures formed through the central region to define spokes therebetween to enhance torsionally resilient characteristics of the central region; and
a shaft operably attached to the second coupling member to apply a torque load to the second coupling member; and wherein
the first coupling member engages the second coupling member so that the first set of teeth engage the second set of teeth, the hub is received in the central alignment recess, the flange nests within the recess, and wherein a drive force is transmitted from one of the first or second coupling members to another of the first or second coupling members by the shaft, and the spokes cushion the torque loads transmitted to the coupling members by the shaft.

29. The adjustable drive coupling of claim 28, wherein the spokes extend generally in plane with the central region.

30. The adjustable drive coupling of claim 28, wherein the first set of teeth extend from a facial surface of the flange and are arranged around a perimeter of the facial surface of the flange.

31. The adjustable drive coupling of claim 28, wherein the flange is completely received within the recess.

* * * * *